(12) United States Patent  
Daigle

(10) Patent No.: US 7,844,675 B2
(45) Date of Patent: Nov. 30, 2010

(54) ACCESSING WEB SERVICES

(75) Inventor: Brian Daigle, Marietta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 785 days.

(21) Appl. No.: 11/304,477

(22) Filed: Dec. 15, 2005

(65) Prior Publication Data

US 2007/0143434 A1   Jun. 21, 2007

(51) Int. Cl.
*G06F 15/16* (2006.01)
(52) U.S. Cl. ............... 709/206; 709/217; 709/218; 709/219; 709/227
(58) Field of Classification Search ............ 709/206, 709/204, 201, 217, 220, 227
See application file for complete search history.

(56) References Cited

U.S. PATENT DOCUMENTS

| | | | | |
|---|---|---|---|---|
| 7,003,571 B1 * | 2/2006 | Zombek et al. | | 709/227 |
| 7,146,420 B2 * | 12/2006 | Dahlman et al. | | 709/225 |
| 7,305,546 B1 * | 12/2007 | Miller | | 713/153 |
| 7,437,481 B2 * | 10/2008 | Bond et al. | | 709/246 |
| 7,447,768 B2 * | 11/2008 | Kelly et al. | | 709/224 |
| 7,464,268 B2 * | 12/2008 | Kent et al. | | 713/176 |
| 7,475,420 B1 * | 1/2009 | Hernacki | | 726/2 |
| 7,505,574 B2 * | 3/2009 | O'Brien et al. | | 379/202.01 |
| 7,532,890 B2 * | 5/2009 | Davies et al. | | 455/449 |
| 7,539,724 B1 * | 5/2009 | Callaghan | | 709/205 |
| 7,613,176 B2 * | 11/2009 | Boni et al. | | 370/352 |
| 7,639,674 B2 * | 12/2009 | Yeh et al. | | 370/359 |
| 7,734,909 B1 * | 6/2010 | Roush et al. | | 713/154 |
| 2003/0125927 A1 * | 7/2003 | Seme | | 704/3 |
| 2004/0078424 A1 * | 4/2004 | Yairi et al. | | 709/203 |
| 2004/0098339 A1 * | 5/2004 | Malek et al. | | 705/44 |
| 2004/0260820 A1 * | 12/2004 | Bearman | | 709/229 |
| 2004/0267942 A1 * | 12/2004 | Maes | | 709/228 |
| 2005/0050152 A1 * | 3/2005 | Penner et al. | | 709/207 |
| 2005/0071434 A1 * | 3/2005 | Hettish et al. | | 709/207 |
| 2005/0108557 A1 * | 5/2005 | Kayo et al. | | 713/189 |
| 2005/0111653 A1 * | 5/2005 | Joyce et al. | | 379/265.09 |
| 2005/0171999 A1 * | 8/2005 | Bond et al. | | 709/203 |
| 2005/0267942 A1 * | 12/2005 | Quinn et al. | | 709/206 |
| 2006/0013205 A1 * | 1/2006 | Daniell et al. | | 370/352 |
| 2006/0031367 A1 * | 2/2006 | Buford et al. | | 709/207 |
| 2006/0150245 A1 * | 7/2006 | Cheng et al. | | 726/12 |
| 2006/0150249 A1 * | 7/2006 | Gassen et al. | | 726/23 |
| 2006/0206933 A1 * | 9/2006 | Molen et al. | | 726/14 |
| 2007/0094725 A1 * | 4/2007 | Borders | | 726/22 |
| 2007/0168449 A1 * | 7/2007 | Malik et al. | | 709/207 |
| 2007/0180509 A1 * | 8/2007 | Swartz et al. | | 726/9 |
| 2009/0049296 A1 * | 2/2009 | Kent et al. | | 713/160 |

* cited by examiner

*Primary Examiner*—Thu Nguyen
*Assistant Examiner*—Angela Widhalm
(74) *Attorney, Agent, or Firm*—Thomas, Kayden, Horstemeyer & Risley, LLP

(57) ABSTRACT

One Embodiment of the present disclosure provides a method for accessing web services. In this regard, one embodiment of such a method, among others, can be broadly summarized by the following steps: receiving a request for a web service, the request being in an instant messaging format; converting the request into a native format utilized by the web service; and relaying the request in the native format to the web service. Other methods and devices are also provided.

18 Claims, 8 Drawing Sheets

ACCESSING WEB SERVICES

TECHNICAL FIELD

The present disclosure is generally related to network communications and, more particularly, is related to web services.

BACKGROUND

The default IP (Internet Protocol) port number used by web servers for web (Hyper Text Transfer Protocol) transactions is port 80. Requests that come into a web server at port 80 often result in returning an HTML (HyperText Markup Language) page to a client web browser. Port 80 requests may also call a CGI (Common Gateway Interface) script, ISAPI (Internet Server Application Program Interface) or ASP (Active Server Pages) process, a server-side include (SSI) or a Java servlet, all of which perform some process in the web server and then typically return an HTML page with the results. A request coming into port 80 may result in any file being copied from the web server to the requesting client.

Many Internet Service Providers (ISPs) prohibit a web server from being operated by users to regulate bandwidth consumed by a user. In particular, users are prevented from serving up a web page and web services from their home by blocking incoming traffic to port 80 before the traffic reaches a user's client machine.

Thus, a heretofore unaddressed need exists in the industry to address the aforementioned deficiencies and inadequacies.

SUMMARY

Embodiments of the present disclosure provide methods, systems, and devices for accessing web services. In this regard, one embodiment of such a method, among others, can be broadly summarized by the following steps: receiving a request for a web service, the request being in an instant messaging format; converting the request into a native format utilized by the web service; and relaying the request in the native format to the web service.

Embodiments also include a computer readable medium having a computer program for performing the above steps. Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
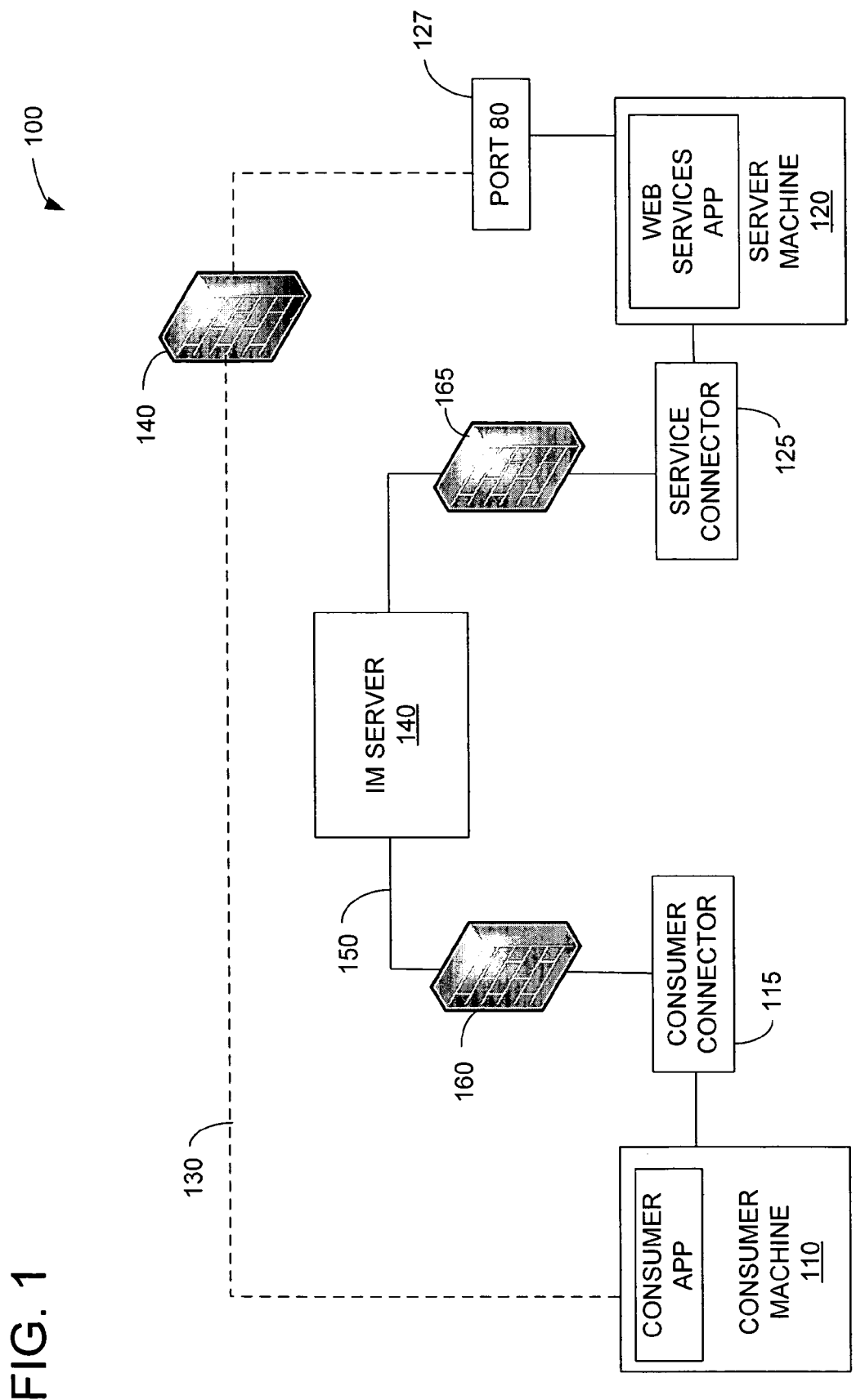
FIG. 1 is a block diagram of one embodiment of a system 100 for accessing web services of the present disclosure.

FIG. 1 is a block diagram of one embodiment of a system 100 for accessing web services. As shown in the figure, two computer machines 110, 120 are included. In a sample scenario, the two computer machines 110, 120 are attempting to communicate with one another. One machine 110 may be referred as a consumer machine hosting a consumer application that is attempting to access a web service. The other machine 120 may be referred as a server machine that hosts a web services application that publishes a web service. Accordingly, the consumer machine 110 is interested in accessing the web service provided by server machine 120.

Generally, web services use Hypertext Transfer Protocol (HTTP) and SOAP (Simple Object Access Protocol) to make data available on the web by exposing application objects (COM (Component Object Model) objects, Java Beans, etc.) to SOAP calls over HTTP and executing remote function calls from web service consumers.

Port 80 is the primary port used by the world wide web (www) system. Web servers open this port then listen for incoming connections from web browsers. Similarly, when a web browser is given a remote address (like bellsouth.com), it assumes that a remote web server will be listening for connections on port 80 at that location.

Referring back to FIG. 1, one potential connection between the two machines 110, 120 is represented by the dotted line 130 in FIG. 1, where a connection between the consumer's machine 110 and the web services or server machine 120 may be established by opening a connection on port 80 (127) of the server machine 120. However, in many instances, an Internet service provider (ISP) or network administrator of the web services machine 120 blocks incoming traffic to port 80 with firewall 140, and therefore, this connection 130 is not possible.

The firewall 140 may sit between a private ISP network and the Internet. The firewall 140 examines inbound traffic to the private network from the Internet. As previously mentioned, the firewall 140 is often configured to block packets destined for port 80. In other words, the firewall 140 may reject any requests from users outside the private network for web pages from inside the private network.

In accordance with the present disclosure, another entry point to the server machine 120 may be explored to allow multiple points of access to the web service published by the server machine 120. If port 80 127 is blocked, a connection may be established using an instant messaging server 140 (or other messaging server) to communicate between the two machines 110, 120. Each of the machines 110, 120 is operable to run software to facilitate the communication.

In particular, the consumer machine 110 has consumer connector software (115) and the server machine 120 has service connector software (125). Via establishing an instant messaging session between the two machines 110, 120, another connection path 150 is established for accessing web services. In FIG. 1, this path 150 moves from consumer connector 115 to firewall 160 to instant messaging server 140 to firewall 165 to service connector 125, where firewalls 160, 165 are configured to allow instant messaging traffic to pass in and out of the respective networks of the consumer machine 110 and server machine 120.

In accordance with one embodiment, the consumer connector 115 and service connector 125 transform web service methods and parameters into a format that is acceptable for transmitting utilizing an instant messaging protocol.

In one embodiment, a web service is published with a WSDL (web service description library) which describes the web service and how to translate methods and parameters into an XML (eXtensible Markup Language) format that a web service can understand and interpret. For example, the WSDL for a web service published by the server machine 120 may describe the protocol bindings and message formats required to interact with the web service. The supported operations and messages are described abstractly, and then bound to a concrete network protocol and message format. A client program, such as consumer application in machine 110, connecting to a web service can read the WSDL to determine what functions are available on the server machine 120. The consumer application can then use SOAP to actually call one of the functions listed in the WSDL.

In one embodiment, the consumer connector 115 performs a translation from a method call invoked by the consumer application into an XML format that can then be tunneled or transported across an instant messaging session. For example, the instant messaging session may be established using an instant messaging server 140 located outside of the networks of the respective machines 110, 120. The service connector 125 then performs a translation from the format used in the instant messaging session to the native language of the method call understood by the web service at the server machine 120, as originally invoked by the consumer application.

Figure 2:
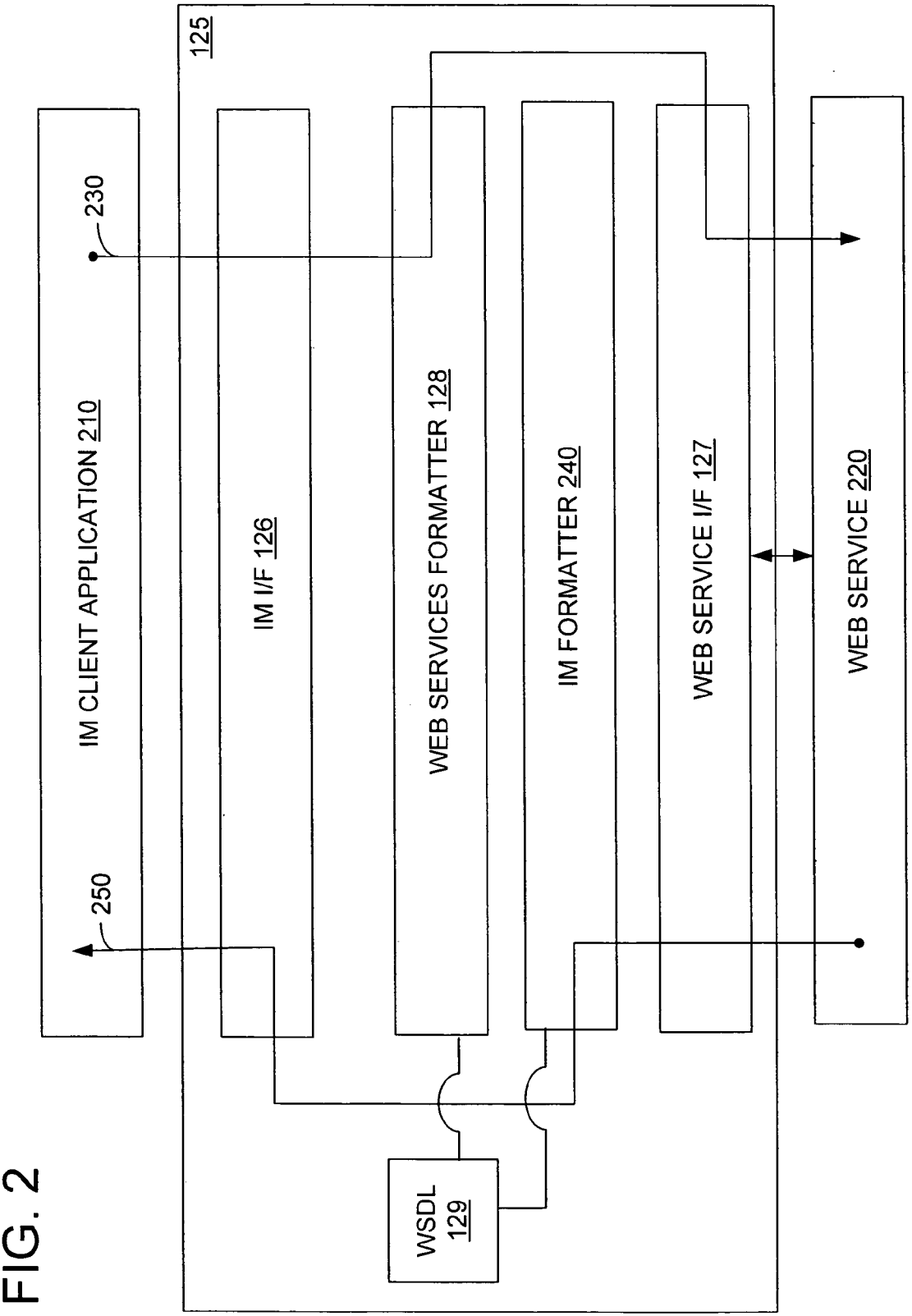
FIG. 2 is a block diagram of aspects of a service connector component of FIG. 1 according to one embodiment.

Referring now to FIG. 2, aspects of the service connector software 125 are discussed. As part of the service connector component 125, an instant messaging interface (IM IF 126) is provided to interface with an instant messaging application 210. The instant messaging client application 210 sends and receives instant messages over the Internet. The service connector software 125 also has a web service interface 127 that interfaces with a web service application on the server machine 120. In particular, the web service interface 127 has the ability to open a socket and communicate across port 80 to talk to a web service 220 within the server machine 120.

In one example, a request to a web service may be received by the server machine 120. In particular, the request is received as an instant message (within an instant message session between the server machine 120 and the consumer machine 110) by the instant message application 210 of the server machine 120. The service connector software 125 prepares the request for processing by the web service on the server machine 120.

In particular, the instant messaging interface 126 of the service connector software 125 receives the instant message and delivers the message to a web services formatter component 128 of the service connector software 125. The web services formatter component 128 translates and parses parameters of the instant message based upon WSDL 129 information that is obtained about the web service. The result is that a web service request (e.g., in an HTTP protocol) is constructed in the proper format to be understood by the web service. The request is to be used to invoke a method execution on web service components.

To obtain the information of how to translate method parameters in the instant messaging format to web service request for function calls, the service connector loads up the WSDL 129 for the web service. In one embodiment, the service connector may have WSDL compiled within the executable code of the service connector. Also, in alternative embodiments, the service connector may access an external WSDL file and use it to understand how the parameters are parsed at runtime. After the service connector has the information of how to translate these method parameters to actual function calls and responses, the function or method call is generated and relayed to the web service 220 via the web service interface 127. This general process is represented by the line 230 starting from component 210 to component 220 in FIG. 2.

The web service 220 then processes the request and produces a response or output (e.g., in an XML format) that is to be passed back to the consumer application that made the original request. Accordingly, the response (e.g., in an XML format) is received by the web service interface 127 and passed to an instant messaging formatter 240. The instant messaging formatter 240 prepares the response for transmission as an instant message as part of an instant messaging session between the server machine 120 and the consumer machine 110. The instant messaging formatter 240 may utilize the WDSL 129 information to determine how to parse and package response parameters as an instant message. Accordingly, the prepared instant message is then passed to the instant messaging interface 126 so that it may be relayed to the instant messaging application 210 and transmitted to the consumer machine 110.

To the web service application, the web service request appears as a standard request although the web server request was created internally within the server machine 120 from an instant message. Although the web service is not exposed to other users from outside its network (such as users from the Internet), access to the web service may be obtained by tunneling or transporting a request through an instant message service.

In summary, FIG. 2 shows a process for receiving a request for a web service and generating a response over an instant messaging path using XML translations and parameter matching to an actual method call.

Figure 3:
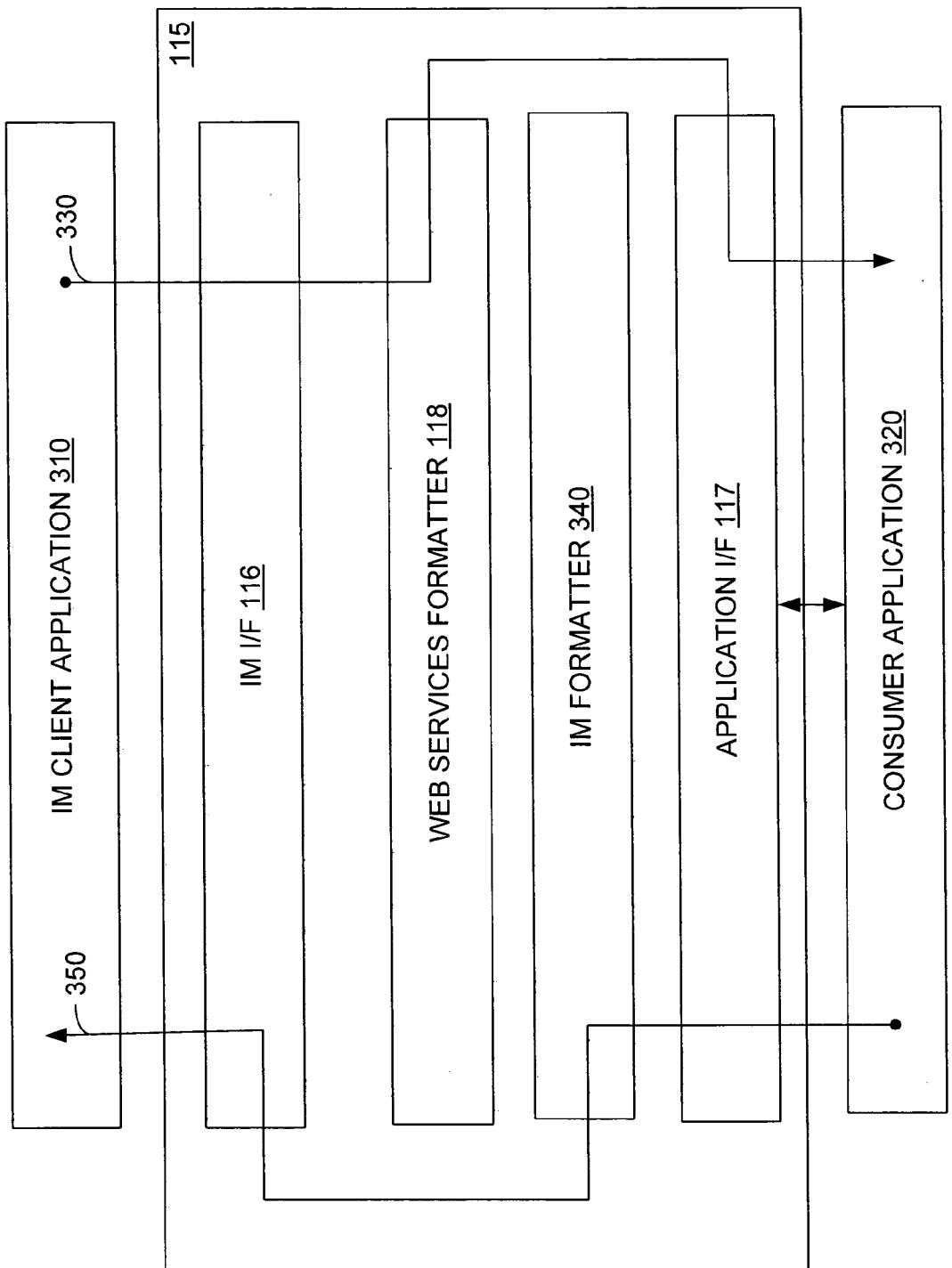
FIG. 3 is a block diagram of aspects of a consumer connector component of FIG. 1 according to one embodiment.

The functionality of the consumer connector 115 is similar to that shown in FIG. 2. An exemplary embodiment of the consumer connector 115 is shown in FIG. 3. As part of the consumer connector component 115, an instant messaging interface (IM IF 116) is provided to interface with an instant messaging client application 310. The instant messaging client application 310 sends and receives instant messages over the Internet. The consumer connector software 115 also has an application interface 117 that interfaces with a consumer application 320 on the consumer machine 110. In particular, the consumer application generates web service requests for a method call to a web service and acts upon web service responses.

To generate a web service request, the consumer application 320 may access the WSDL information 129 from the web service machine 120. Once the request for method call is made by the consumer application 320, the request is received by the application interface 117 which relays the request to the instant messaging formatter component 340. The instant messaging formatter 340 packages the request in the form of an instant message that is transmitted to the server machine 120 by the instant messaging interface 116 and instant messaging application 310. This process is generally represented by the line 350 flowing from consumer application 320 to instant messaging client application 310.

When a response is received from the server machine 120, the response, in the form of an instant message, is received by the instant messaging application 310 and the instant messaging interface 310. The instant messaging interface 310 forwards the message to the web service formatter 118 which parses the instant message to obtain the parameters of the web service response and formats the parameters as the web service response. To do so, the web service formatter may access WSDL information 129 from the server machine 120. The web service response is then relayed to the consumer application 320 via the application interface 117. This process is generally represented by the line 330 flowing from instant messaging client application 310 to consumer application 320.

Requests from the consumer application 320 to a web service 220 that are in the form of an instant message are transported through the instant messaging session associated with the consumer connector software 115. In this way, a connection has already been established between the consumer machine 110 and the server machine 120. This connection is facilitated by an instant messaging server 140. For example, the consumer machine 110 establishes a connection or instant messaging session with the instant messaging server 140 (which does not have port 80 requests blocked) as part of an instant messaging session. Then, the server machine 120 is associated with the connection by the instant messaging server 140 in joining the instant messaging session.

A consumer application 320 may wait for a response to be received in reply to a request in a synchronous manner over the same connection and instant messaging session. In alternative embodiments, a response may be received in an asynchronous manner.

With an asynchronous web service call in accordance with an embodiment of the present disclosure, a request may be sent over an instant messaging connection and the connection may be terminated. After whatever length of time it takes for a server to make a response, a new connection is then established and the response may be sent back to the consumer application from the web service. For example, a cookie or some sequence number may be included in the response so that the response may be matched up with the originating request by the consumer connector. The transport mechanism of the instant messaging pathway makes the web service asynchronous as opposed to an HTTP transport mechanism that is designed to have the client initiate each message exchange with a server.

One benefit of the present disclosure is that the instant messaging transport mechanism and the web service are independent in terms of the communications being tunneled. Any instant messaging transport protocol or platform (e.g., Yahoo, MSN, Jabber, etc.) may be used to transport the information through and then the respective connectors 110, 120 can be integrated to operate with any web service components. As long as a web service call may be made and an instant messaging service may be communicated, these connectors 110, 120 may be configured to perform the necessary functions.

In one sense, an embodiment of the present disclosure may be characterized as employing a central messaging server as a proxy between two computer machines that have established connections with the central messaging server. In an additional embodiment, the established connections may be established over port 80 where the respective machines are establishing connections with the central messaging server by sending requests to the server and not receiving requests from outside sources. One potential use of this approach is home based services.

For example, home consumer devices, like digital video recorders (DVRs), MP3 players, etc. could utilize web services to expose themselves and serve their content as a web site. In one instance, a user may serve up his or picture album from a DVR so that other persons can browse directly to it.

Figure 4:
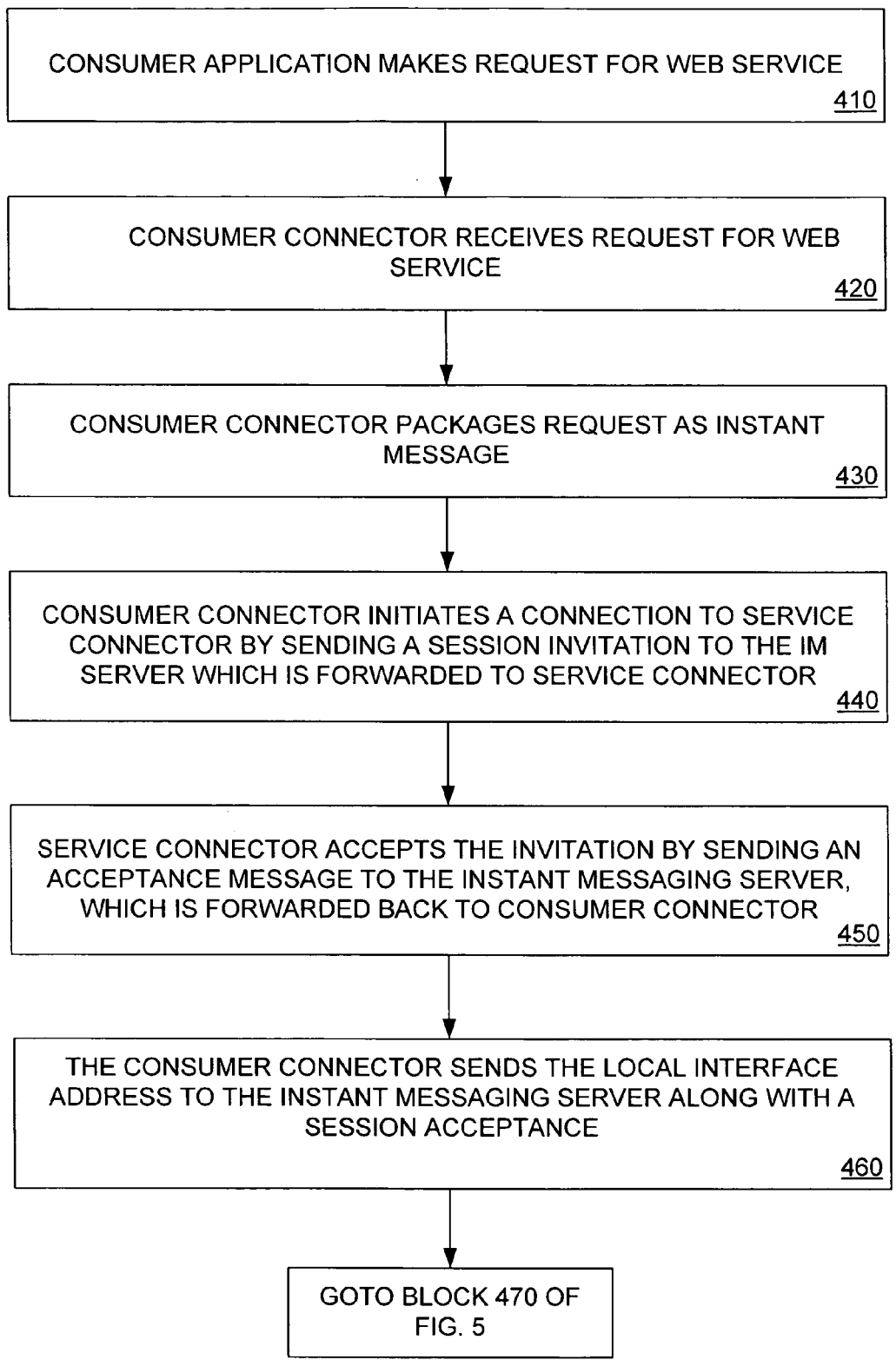
FIGS. 4-5 are diagrams illustrating exemplary interactions between a consumer application and a web service of FIG. 1.

In one embodiment, the interactions between a consumer application and a web service is as shown in FIG. 4. First, a consumer application makes (410) a request for a web service. The consumer connector 115 receives the request (420) for the web service and packages (430) the request as an instant message.

Then, the consumer connector 115 initiates (440) a connection to the service connector 125. This results in the consumer connector 115 sending a session invitation to an instant messaging server 140, which is forwarded to service connector 125. The service connector 125 accepts (450) the invitation by sending an acceptance message to the instant messaging server 140, which is forwarded back to the consumer connector 115.

The consumer connector 115 retrieves the network Internet Protocol (IP) address for the consumer machine 110 and a port number to be used for SIP signaling. This is the local interface address. This address is sent (460) to the instant messaging server 140 along with a session acceptance. The consumer connector 115 is also prepared to listen for incoming calls to this address and port.

Figure 5:
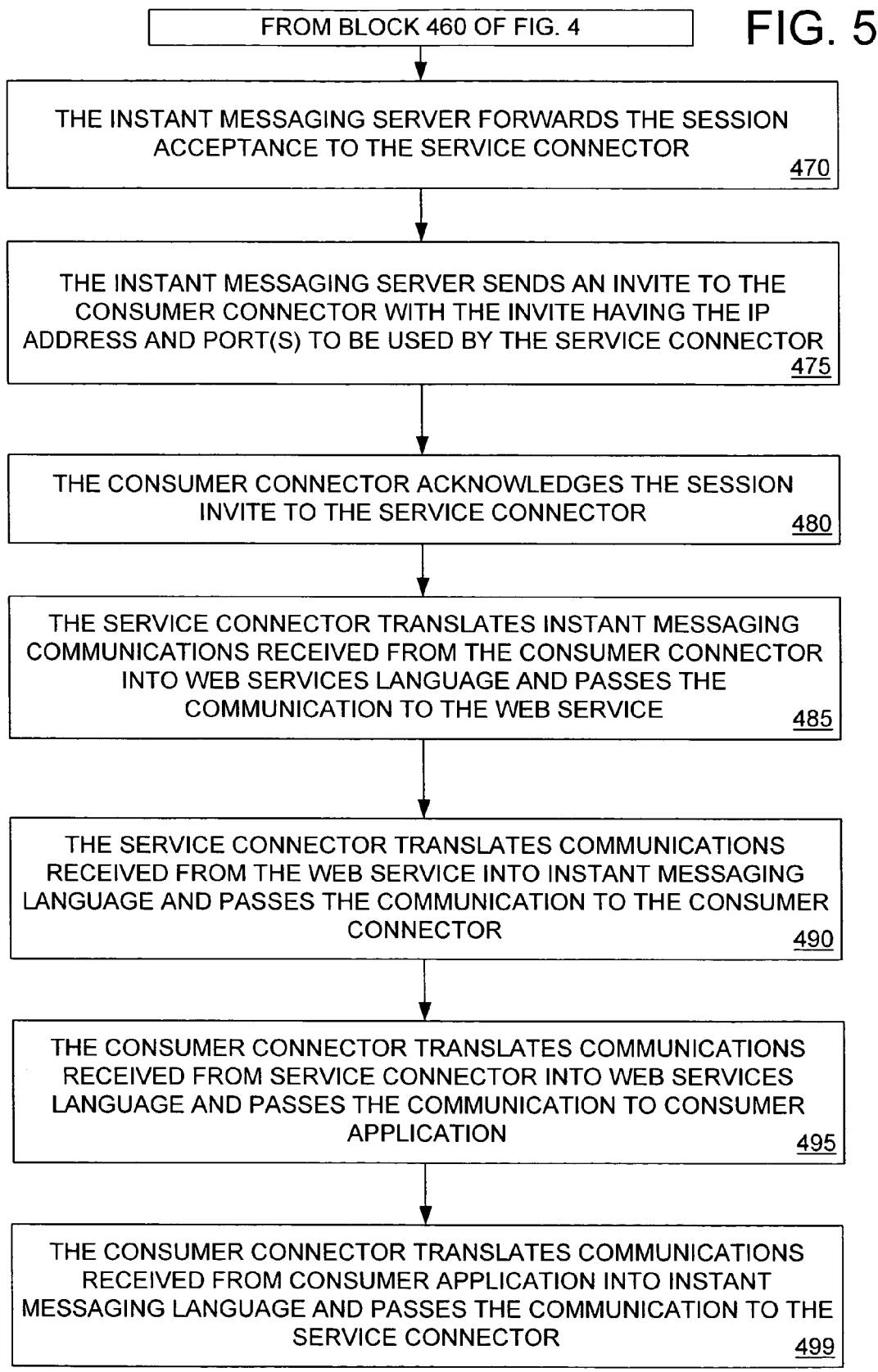

As shown in FIG. 5, the instant messaging server 140 forwards (470) the session acceptance to the service connector 125. The service connector 125 then retrieves its IP address and uses this address to request a SIP session. This results in a session invite (e.g., a SIP INVITE) being sent (475) to the consumer connector 115. In this invitation, the service connector 125 provides its own IP address and the port(s) it expects to receive SIP signaling. This INVITE comes to the consumer connector 115 on the IP address provided by the consumer connector 115 in the acceptance message. Note, that SIP is one exemplary protocol, among others, such as XMPP (Extensible Messaging and Presence Protocol), that may be used in a connection-oriented session, in accordance with exemplary embodiments.

The consumer connector 115 acknowledges (480) the session invite to the service connector 125. A final acknowledgement is sent from service connector 125 to consumer connector 115. The session is now in place and the media destination addresses are known. Data streams can be sent between the consumer and service connectors.

Accordingly, the service connector 125 translates (485) instant messaging communications received from the consumer connector 115 into web services language and passes the communication to the web service. Correspondingly, the service connector 125 translates (490) communications received from the web service into instant messaging language and passes the communication to the consumer connector 115.

Also, the consumer connector 115 translates (495) communications received from service connector 125 into web services language and passes the communication to consumer application. Likewise, the consumer connector 115 translates (499) communications received from consumer application into instant messaging language and passes the communication to the service connector 125.

Figure 6:
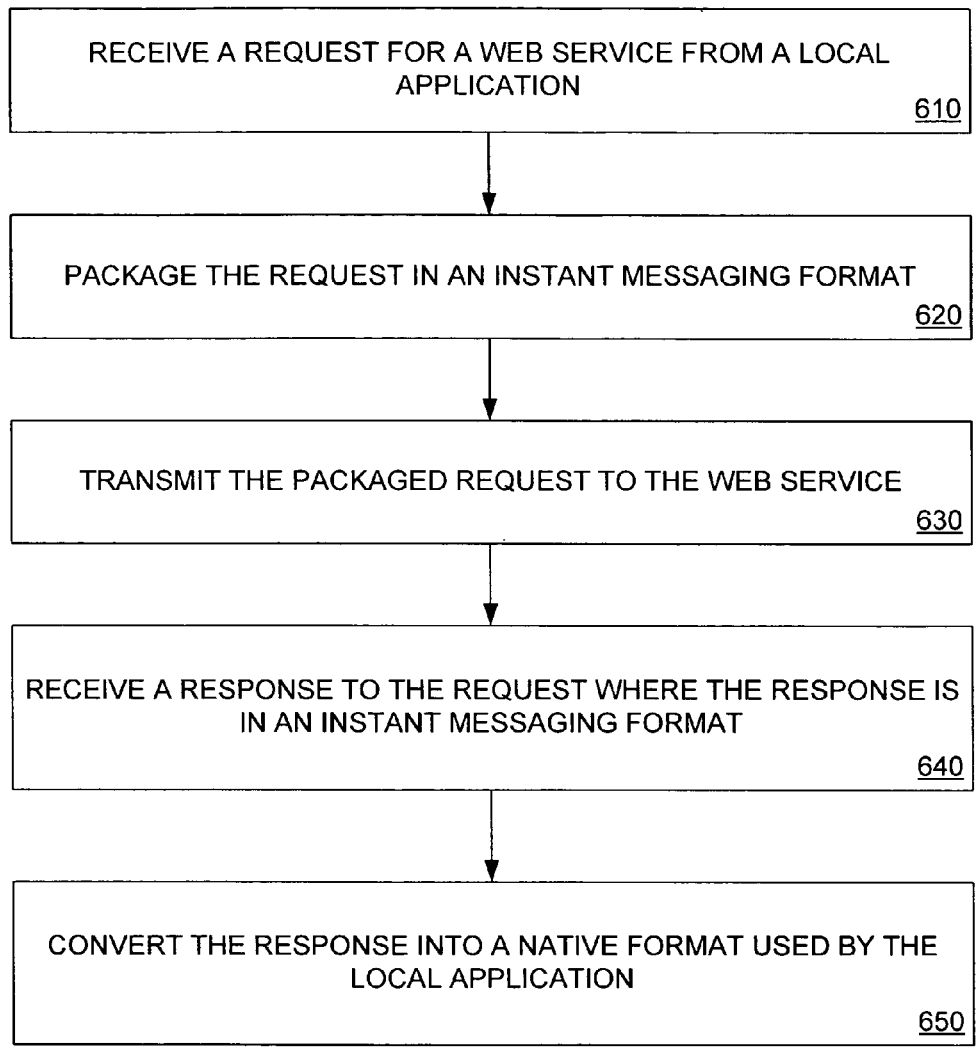
FIG. 6 is a flow chart describing one embodiment of a method for accessing web services in accordance with FIG. 1.

Next, FIG. 6 depicts a flow chart describing one embodiment of a method for accessing web services in accordance with the present disclosure. To begin, a request for a web service from a local application is received (610). In response, the request is packaged (620) in an instant messaging format and transmitted (630) to the web service. For example, the computer machine hosting the web service may be prohibited from receiving an incoming request for the web services.

However, by using instant messaging communications, the request may be delivered to the web service. Correspondingly, a response to the request may also be received (640), where the response is in an instant messaging format. In response, the response may be converted (650) into a native format (e.g., XML) used by the local application.

Figure 7:
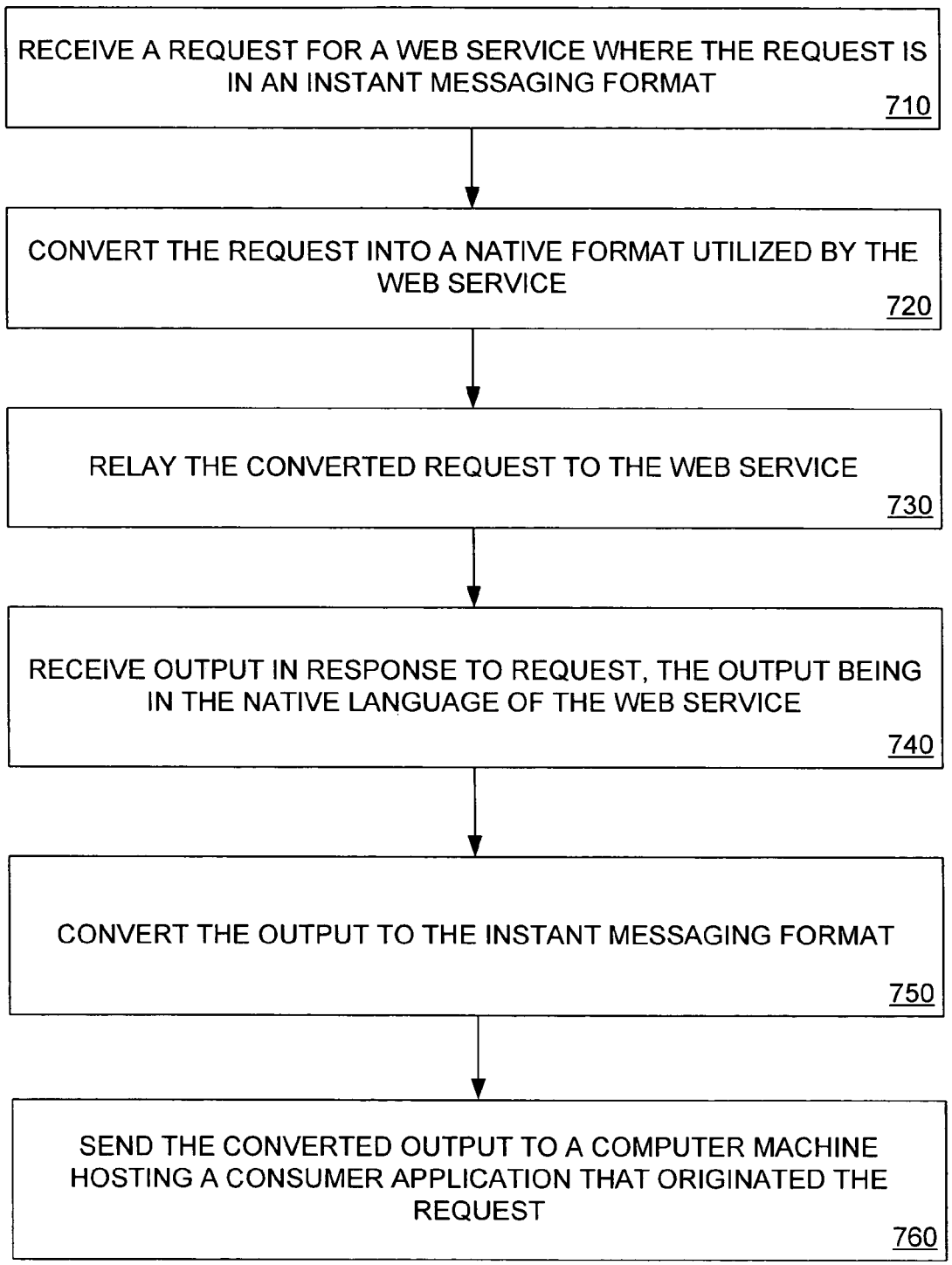
FIG. 7 is a flow chart describing one embodiment of a method for accessing web services in accordance with FIG. 1.

FIG. 7 also depicts a flow chart describing one embodiment of a method for accessing web services in accordance with the present disclosure. In this embodiment, a request for a web service is received (710), where the request is in an instant messaging format. In response, the request is converted (720) into a native format utilized by the web service and relayed (730) to the web service. For example, the computer machine hosting the web service may be prohibited from receiving an incoming request for the web services. However, by using instant messaging communications, the request may be delivered to the web service. Correspondingly, output is received (740) output in response to request, the output being in the native language of the web service. The output is then converted (750) into the instant messaging format and sent (760) to a computer machine hosting a consumer application that originated the request.

Figure 8:
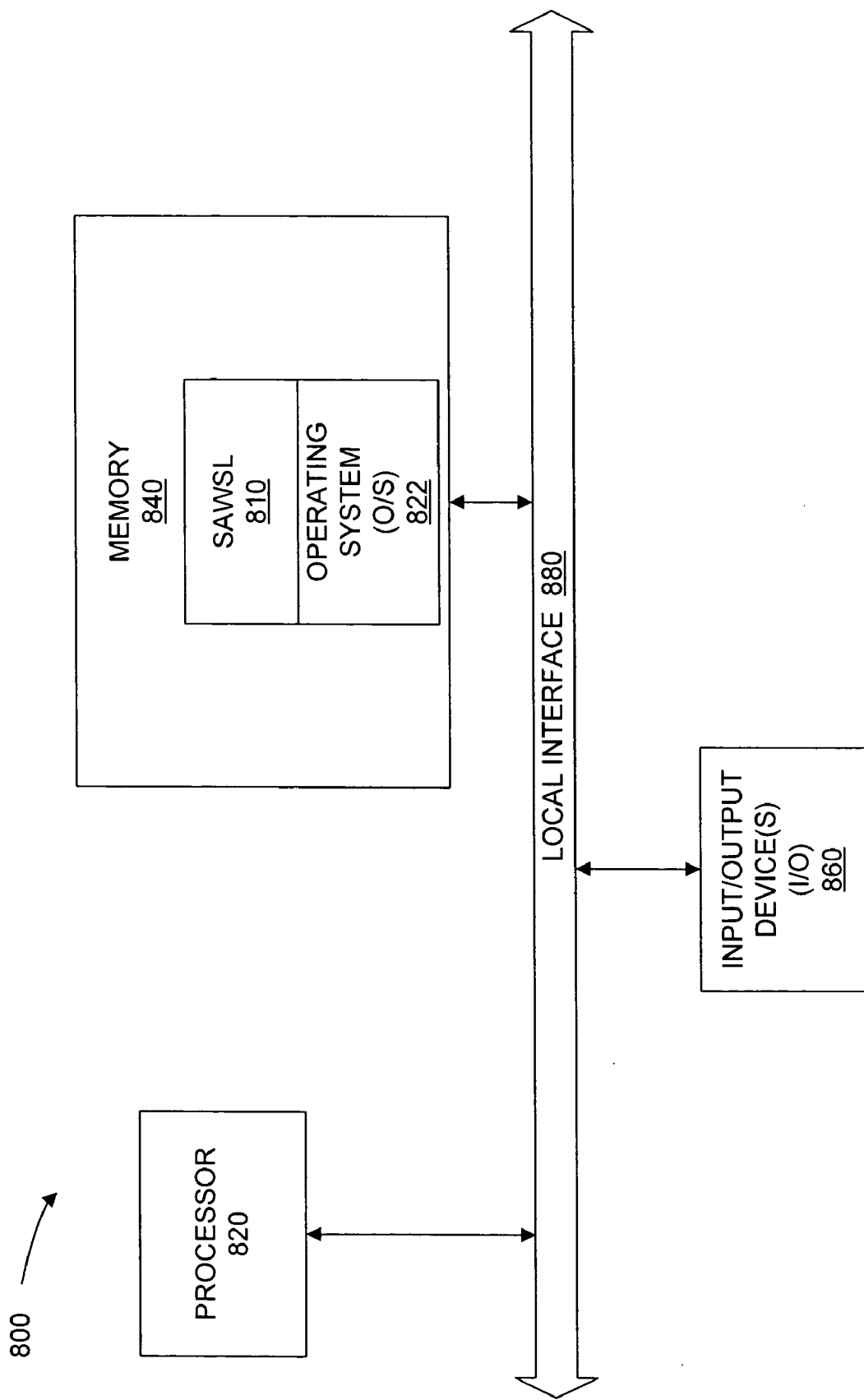
FIG. 8 is a block diagram of a computer that can implement components of the system of FIG. 1 according to one embodiment.

Embodiments of the present disclosure can be implemented in hardware, software, firmware, or a combination thereof. Logic components of the business to business instant messaging system may be implemented in software, as an executable program, and is executed by a server, special, or general purpose digital computer, workstation, minicomputer, or mainframe computer. An example of a computer that can implement logical components of the system for accessing web services 100 of the present disclosure is shown in FIG. 8. In FIG. 8, the system for accessing web services logic (SAWSL) is denoted by reference numeral 810.

Generally, in terms of hardware architecture, as shown in FIG. 8, the computer 800 includes a processor 820, memory 840, and one or more input and/or output (I/O) devices 860 (or peripherals) that are communicatively coupled via a local interface 880. The local interface 880 can be, for example but not limited to, one or more buses or other wired or wireless connections, as is known in the art. The, the local interface may include address, control, and/or data connections to enable appropriate communications among the aforementioned components.

The processor 820 is a hardware device for executing software, particularly that stored in memory 840. The memory 840 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 840 may incorporate electronic, magnetic, optical, and/or other types of storage media. Note that the memory 840 can have a distributed architecture, where various components are situated remote from one another, but can be accessed by the processor 820.

The software in memory 840 may include one or more separate programs, each of which comprises an ordered listing of executable instructions for implementing logical functions. In the example of FIG. 8, the software in the memory 840 includes the system for accessing web service logic (SAWSL) 810 in accordance with the present disclosure and a suitable operating system (O/S) 822. The operating system 822 controls the execution of other computer programs and provides scheduling, input-output control, file and data management, memory management, and communication control and related services.

The I/O devices 860 may include input devices, for example but not limited to, a keyboard, mouse, scanner, microphone, etc. Furthermore, the I/O devices 860 may also include output devices, for example but not limited to, a printer, display, etc. Finally, the I/O devices 860 may further include devices that communicate both inputs and outputs, for instance but not limited to, a modulator/demodulator (modem; for accessing another device, system, or network), a radio frequency (RF) or other transceiver, a telephonic interface, a bridge, a router, etc When components of the system for accessing web services are implemented in software, the software can be stored on any computer readable medium for use by or in connection with any computer related system or method. In the context of this document, a computer readable medium is an electronic, magnetic, optical, or other physical device or means that can contain or store a computer program for use by or in connection with a computer related system or method.

One or more components of the system for accessing web services can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

In an alternative embodiment, where one or more components of the system for accessing web services are implemented in hardware, the component(s) can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments are merely possible examples of implementations, merely set forth for a clear understanding of the principles of the disclosure. Many variations and modifications may be made to the above-described embodiment(s) without departing substantially from the spirit and principles of the present disclosure. All such modifications and variations are intended to be included herein within the scope of this disclosure.

The invention claimed is:

1. A method for accessing a web service, comprising:
receiving a web service request for the web service from a local application web service consumer, the web service request being in a web service format;
wrapping the web service request in an instant messaging format as an instant messaging version of the web service request, wherein the instant message version of the web service request contains a native web service format of the web service request; and
transmitting the instant message version of the web service request to an instant messaging port of a computer machine hosting the web service, wherein the computer machine is blocked from receiving inbound web service traffic and is allowed to receive inbound instant messaging traffic such that remote access to the web service on the computer machine is obtained by tunneling the web service request through an instant messaging service via the instant message version of the web service request.

2. The method of claim 1, wherein the computer machine hosting the web service is prohibited from receiving an incoming HTTP request for the web service.

3. The method of claim 1, further comprising:
receiving an instant message response to the web service request, the instant message response being in the instant messaging format, wherein the instant message version of the web service request has been unwrapped to obtain the web service request and the computer machine hosting the web service receives the web service request and responds with a web service response to the web service request that is subsequently wrapped within the instant messaging format as the instant message response; and
unwrapping the instant message response into the native web service format used by the local application web service consumer.

4. The method of claim 2, wherein the instant message response is received in an asynchronous manner with respect to the instant message version of the web service request from the local application web service consumer.

5. The method of claim 1, further comprising:
establishing an instant messaging connection with an instant messaging server, wherein the instant messaging server forwards communications originating from the local application web service consumer to the web service.

6. The method of claim 5, further comprising:
closing the instant messaging connection with the instant messaging server before the web service response is sent by the web service.

7. A method for accessing a web service, comprising:
receiving a web service request for the web service from a local web service consumer, the web service request being in a web service format;
wrapping the web service request into an instant messaging format as an instant messaging version of the web service request, wherein the instant message version of the web service request contains the native web service format;
transmitting the instant message version of the web service request in the instant messaging format to an instant messaging port of a remote server machine hosting the web service, wherein the remote sever machine is blocked from receiving inbound web service traffic and is allowed to receive inbound instant messaging traffic such that remote access to the web service on the remote server machine is obtained by tunneling the web service request through an instant messaging service via the instant message version of the web service request;
receiving the instant message version of the web service request for the web service in the instant messaging format at the instant messaging port of the remote server machine;
unwrapping the instant message request in the instant messaging format to obtain the web service request in the native web service format utilized by the web service; and
relaying the web service request in the native format to the web service.

8. The method of claim 7, wherein the remote server machine hosting the web service is prohibited from receiving an incoming HTTP request for the web service.

9. The method of claim 7, further comprising:
receiving output in response to the web service request from the web service, the output being in the native format of the web service;
wrapping the web service output within an instant message output of the instant messaging format; and
sending the instant message output in the instant messaging format to a computer machine hosting the local web service consumer that originated the request.

10. The method of claim 9, wherein the instant message output is transmitted in an asynchronous manner with respect to the instant message version of the web service request from the local web service consumer.

11. The method of claim 7, further comprising:
establishing an instant messaging connection with an instant messaging server, wherein the instant messaging server forwards communications originating from the local web service consumer to the web service.

12. The method of claim 11, further comprising:
closing the instant messaging connection after the instant message version of the web service request in the instant messaging format is received; and
reestablishing a second instant messaging connection with the instant messaging server before the instant message output containing the web service response is sent by the remote server machine hosting the web service.

13. A computer readable storage medium having a computer program for accessing web services, the program having instructions for performing:
receiving an instant message having a web service request for a local web service at an instant messaging port of a computer machine hosting the local web service, the web service request being from a remote computer machine, the web service request being wrapped within the instant message in an instant messaging format, wherein the computer machine is blocked from receiving inbound web service traffic and is allowed to receive inbound instant messaging traffic such that remote access to the web service on the computer machine is obtained by tunneling the web service request through an instant messaging service via the instant message in the instant messaging format;
unwrapping the instant message to obtain the web service request in a native format utilized by the local web service;
relaying the web service request in the native format to the local web service;
receiving web service output in response to the web service request from the local web service, the output being in the native format of the local web service;
wrapping the web service output within an instant message output in the instant messaging format; and sending the instant message output in the instant messaging format to the remote computer machine hosting a consumer application that originated the web service request, wherein logic of the remote computer machine unwraps the instant message output in the instant messaging format to obtain the web service output in a web service language utilized by the consumer application.

14. The computer readable storage medium of claim 13, wherein a computer machine hosting the local web service is prohibited from receiving an incoming HTTP request for the local web service.

15. The computer readable storage medium of claim 13, wherein the instant message output is transmitted in an asynchronous manner with respect to the instant message having the web service request from the consumer application.

16. The computer readable storage medium of claim 13, the program further comprising:

establishing an instant messaging connection with an instant messaging server, wherein the instant messaging server forwards communications originating from the consumer application to the local web service.

17. The computer readable storage medium of claim 16, the program further comprising:
closing the instant messaging connection after the instant message having the web service request is received; and
reestablishing a second instant messaging connection with the instant messaging server before the instant message output containing a web service response is sent by the local web service.

18. The computer readable storage medium of claim 13, wherein logic of the remote computer machine wraps the web service request in the native format of the consumer application within an instant message in the instant messaging format.

* * * * *